United States Patent [19]

Fox

[11] Patent Number: 4,523,557
[45] Date of Patent: Jun. 18, 1985

[54] MODEL AIRPLANE ENGINE

[76] Inventor: Duke Fox, 5305 Towson Ave., Ft. Smith, Ark. 72901

[21] Appl. No.: 606,990

[22] Filed: May 4, 1984

[51] Int. Cl.³ .............................................. F02B 61/04
[52] U.S. Cl. .......................... 123/197 AB; 123/193 P; 123/195 R; 74/579 R; 74/588
[58] Field of Search ............ 123/195 R, 195 C, 195 S, 123/197 AB, 197 AC, DIG. 3, 193 R, 193 P; 74/579 R, 579 E, 588

[56] References Cited

U.S. PATENT DOCUMENTS

| | | | |
|---|---|---|---|
| 2,138,301 | 11/1938 | Howie | 123/DIG. 3 |
| 2,169,236 | 8/1939 | Frazier | 123/195 H |
| 2,610,616 | 9/1952 | Woodruff et al. | 123/DIG. 3 |
| 2,628,765 | 2/1953 | Anderson | 74/588 |
| 2,733,694 | 2/1956 | Brebeck | 123/DIG. 3 |
| 2,791,991 | 5/1957 | Ickes | 123/193 P |
| 3,204,619 | 9/1965 | Rubinowitz et al. | 123/195 R |

FOREIGN PATENT DOCUMENTS 910360  6/1946  France ......................... 123/DIG. 3

Primary Examiner—Craig R. Feinberg
Assistant Examiner—David A. Okonsky
Attorney, Agent, or Firm—Laff, Whitesel, Conte & Saret

[57] ABSTRACT

A small internal combustion engine especially—but not exclusively—for model aircraft is made at an extremely low cost. A crankcase and a fuel tank are made of two casted pieceparts which nest together. The two pieceparts include matching openings which are aligned to provide an air intake and a manifold leading from the fuel tank into the interior of the crankcase. A crankshaft is journaled to rotate within the crankcase. A connecting rod is made from a generally "Y" shaped leaf spring. The stem of the "Y" is mounted on a throw on the crankshaft for producing a reciprocal motion within a cylinder. The tops of the "Y" shaped connecting rod are shaped to form diametrically opposed dimples. A cup-shaped piston has diametrically opposed, internal abuttments formed by a hole drilled through the piston skirt. The dimples on the connecting rod snap into the opposing holes inside the piston.

12 Claims, 19 Drawing Figures

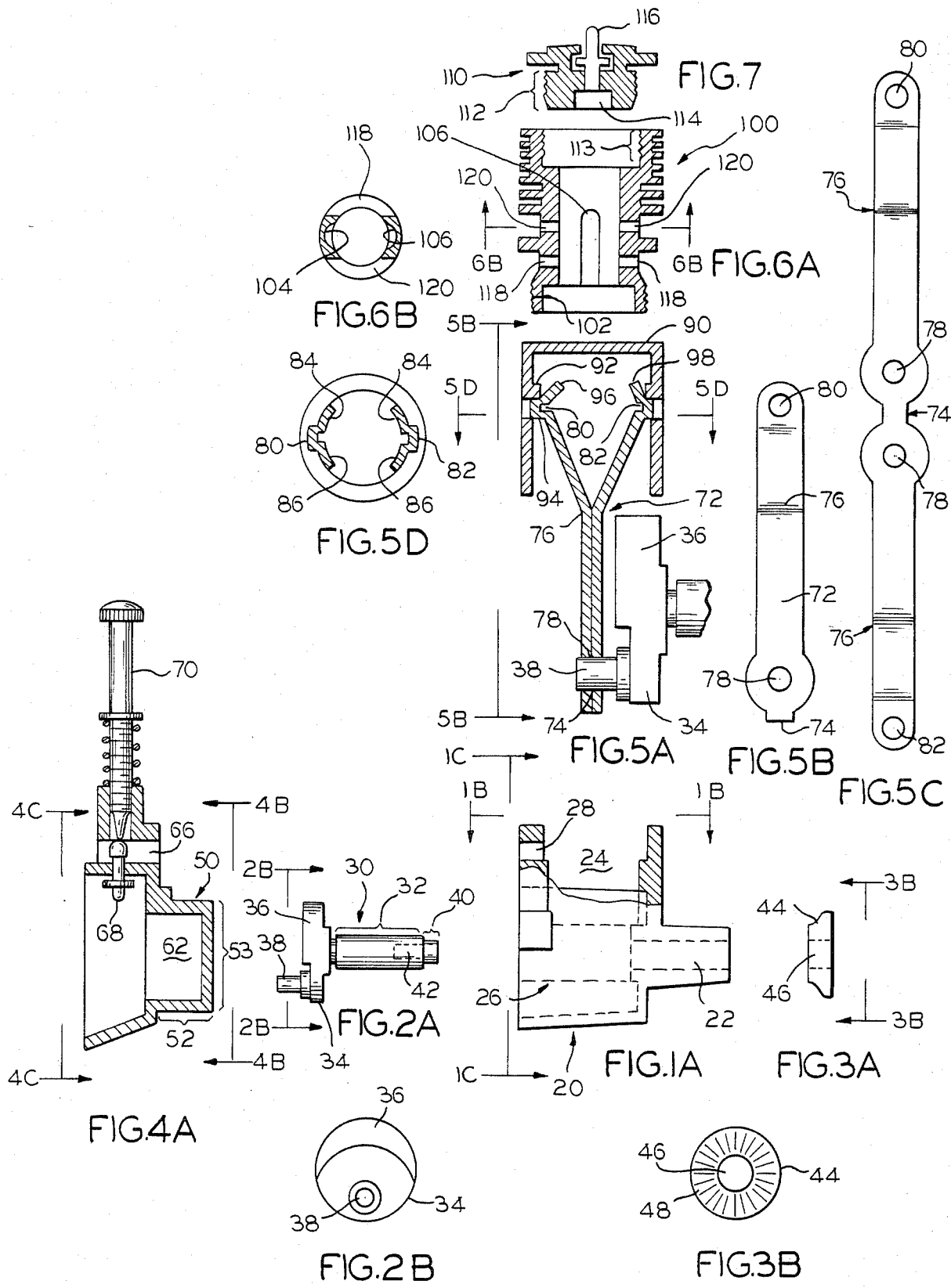

MODEL AIRPLANE ENGINE

This invention relates to very small internal combustion engines and, more particularly, to extremely low cost engines, such as might be used to power small model airplanes.

Model aircraft are made in sizes extending over a relatively large range from big, expensive and complex machines of interest to serious engineers to small, low cost, and simple toys for children. Likewise, the engines for powering these model aircraft extend over a similar wide range from engines large enough to drive a bicycle carrying an adult to extremely small engines for the toys. A difficulty is that the small engines have tended to be as complex as the large ones. Since substantially the same number of parts have had to be assembled in substantially the same way, the small engines have tended to be almost as costly as the large ones.

Accordingly, an object of the invention is to provide new and improved model aircraft engines. In particular, an object is to produce very small engines for low cost model aircraft at the toy end of the scale. Here, an object is to provide new designs and novel assembly techniques which facilitate a sharp reduction in costs.

Another object of the invention is to accomplish these and similar objects without deterioration of engine quality and performance.

In keeping with an aspect of the invention, these and other similar objects are accomplished by a very small and simple engine with fewer parts, made in a simpler manner, as compared to other and more conventional engines. In one embodiment, the inventive engine has a displacement of 0.018 cubic inches. A simple stamped connector rod is made on progressive dies to snap into a piston and to fit over a throw on a crankshaft, thereby reducing costs and simplifying the assembly. The fuel tank and crankcase are two casted parts with aligned port holes formed therein in order to provide intake and manifold systems. Thus, the engine may be made from a few very simple parts which are assembled in a quick and easy manner.

A preferred embodiment of the invention is seen in the attached drawings, wherein:

FIG. 1A is a side elevation of a first piecepart which makes a crankcase;

FIG. 2A is a side elevation view of a crankshaft;

FIG. 2B is an end elevation of the crankshaft taken along line 2B—2B of FIG. 2A;

FIG. 3A is a side elevation of a thrust washer used to keep the crankshaft in place;

FIG. 3B is another side elevation of the thrust washer taken along line 3B—3B of FIG. 3A;

FIG. 4A is a cross sectional view of a second piecepart which both forms the fuel tank and forms a bulkhead for closing the crankcase;

FIG. 5A is a front elevation of part of the crankshaft, a connecting rod, and piston sub-assembly;

FIG. 5B is a side elevation of the connecting rod taken along line 5B—5B of FIG. 5A;

FIG. 5C is a plan view of an intermediate step in the manufacture of the connecting rod;

FIG. 5D is a cross section of the connecting rod and piston taken along line 5C—5C of FIG. 5A;

FIG. 6A is a side elevation of a cylinder;

FIG. 6B is a cross section of the cylinder taken along line 6B—6B of FIG. 6A;

FIG. 7 is a cross section of the cylinder head; and

Figure 8:
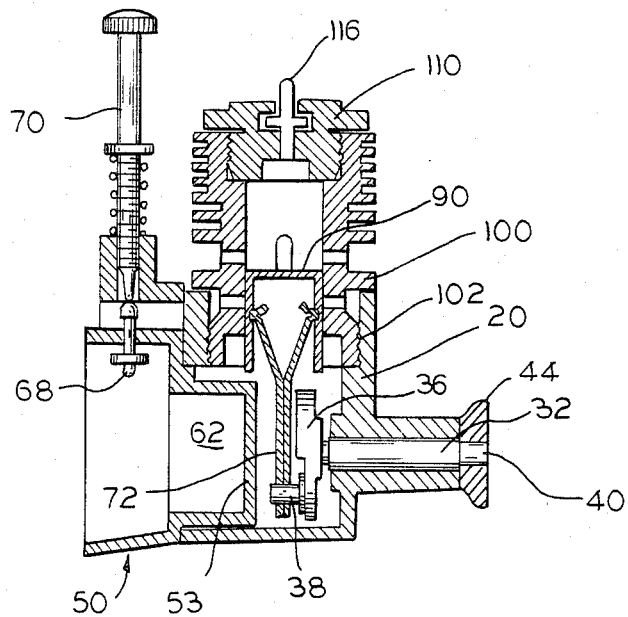
FIG. 8 is an assembly view of the engine.

FIG. 5 is drawn at approximately twice the scale that is used in the rest of the Figures. The general layout of some of the Figures on the sheet of the drawings bearing FIG. 1A corresponds somewhat to an exploded view of the engine. FIG. 8 shows all of the parts assembled together.

The crankcase 20 (FIGS. 1A-1C) is a casted, metal part comprising a journal 22, a piston-cylinder opening 24, and an access port 26. A manifold 28 is a simple opening which is casted into the crankcase 20.

Preferably, the crankshaft 30 (FIG. 2A) is a unitary screw machine part made of steel. The crankshaft includes a smooth straight shaft 32 with a round cross section, designed to rotate in the journal 22 of the crankcase. The inside end of shaft 32 terminates in a circular disc 34 which has a machined part with metal removed to leave a weight 36 which counterbalances the piston and connecting rod. An eccentric or off-center throw or crankarm 38 extends from the disc 34 to receive the crankshaft (as best seen in FIG. 5A). As the crankshaft 32 turns in journal 22, the connecting rod experiences a vertical linear motion.

The outside end of the crankshaft has a section 40 with straight knurls, and a drilled and tapped hole 42. A thrust washer 44 has a center hole 46 which also has mating straight knurls to fit over the section 40 of the crankshaft. Therefore, as the crankshaft 30 turns, the thrust washer must also turn with it. The outside face 48 of the thrust washer is radially knurled (FIG. 3B). The back of the propeller (not shown) has mating radial knurls which engage the knurls 48 of the thrust washer 44. A screw fits through the propeller and hole 46 to turn into the drilled and tapped hole 42 in the outboard end of shaft 32. Thus, this much of the assembly is held together by a single screw.

Figure 1C:
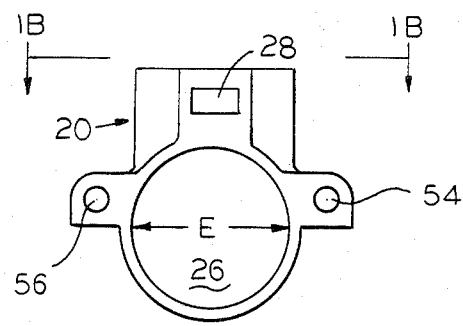
FIG. 1C is a side elevation taken along line 1C—1C of FIG. 1A.
Figure 1B:
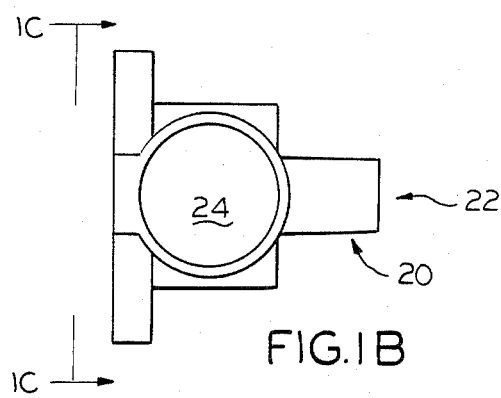
FIG. 1B is a plan view taken along line 1B—1B and looking down on FIG. 1A.
Figure 4B:
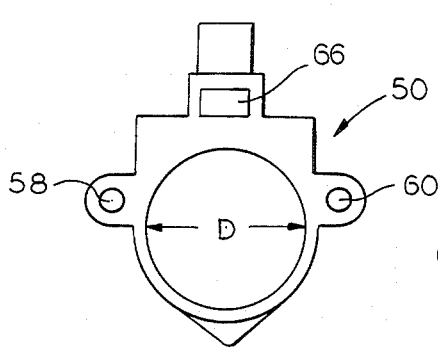
FIG. 4B is a front elevation of the fuel tank taken along line 4B—4B in FIG. 4A.
Figure 4C:
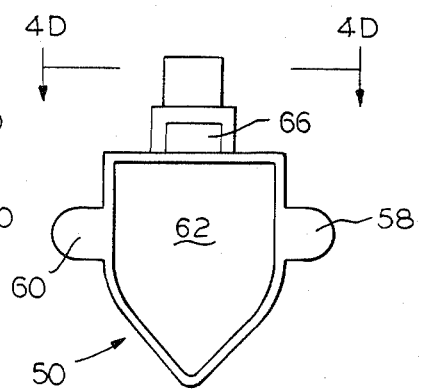
FIG. 4C is a back elevation of the fuel tank taken along line 4C—4C of FIG. 4A.

The back of the crankcase is closed by a cast metal part 50 (FIGS. 4A-4D), which also serves the dual function of a fuel tank. In greater detail, part 50 has a projecting member 52 with a diameter D (FIG. 4B) which corresponds to the diameter E (FIG. 1C) of the opening 26 in the crankcase 20. Therefore, when the part 52 is inserted into the opening 26, the crankcase 20 and fuel tank 50 nest together. The crankcase opening 26 is sealed by the fuel tank side 53 that forms a wall or bulkhead fairly close to the end of the throw or crankarm 38, but with enough space to facilitate a free and easy rotation of the crankshaft 30. The parts 20, 50 are held together by two screws (not shown) passing through holes 54-60 (FIGS. 1C, 4B). The holes 58, 60 are drilled and tapped to receive these screws. A suitable gasket may be provided between parts 20, 50, if desired.

Figure 4D:
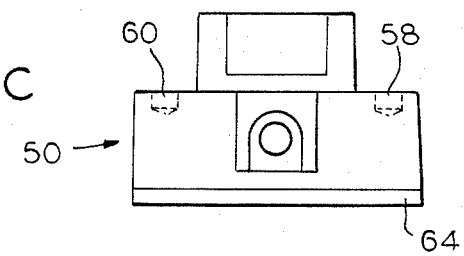
FIG. 4D is a plan view looking down toward the top of the fuel tank and taken along line 4D—4D of FIG. 4C.

The cavity 62 (FIG. 4C) forms the fuel tank. If desired, it may be closed on the back by a solid plate 64 (FIG. 4D). However, in many uses, the motor may be designed to mount on a bulkhead of a model airplane, and that bulkhead may also form the plate 64 for closing the back of the tank, thus eliminating one part of the back of the engine.

According to the invention, an air intake opening 66 is formed through part 50 to align and mate with the manifold opening 28 casted into the crankcase. Thus, the air intake and manifold are made at no expense other than the cost of forming the openings 28, 66 in the casts.

A hole is drilled in the part 50 at a location which is perpendicular to the opening 66. A jet nozzle 68 is pressed through the lower part of this hole and swagged into the wall forming the fuel tank cavity 62. The upper end of the hole is drilled and tapped to receive a threaded needle valve 70. The point of the needle valve cooperates with a hole through the jet nozzle to regulate the amount and rate of fuel that is delivered into the cylinder.

In keeping with an aspect of the invention, the connecting rod is made of a steel strip which is tempered after it is manufactured to form a genarally leaf spring quality in the connecting rod. The connecting rod is made in progressive dies, so that its mechanical shape and contours are formed at extremely precise locations.

In greater detail, the connecting rod 72 is initially a strip (FIG. 5C) which is stamped by a punch press, twice as long as it is shown in FIG. 5B. Then, each of its ends is bent to an angle of about 25° at 76. Near the tip ends, the "Y" strip is shaped and formed into two opposing, outwardly extending dimples or projections 80, 82. Simultaneously, the sides adjacent the dimples are curved, as best seen at 84, 86 in FIG. 5D to fit inside the horizontal cross section of the piston.

Next, the strip is folded in half and back upon itself at 74 to give it a generally "Y" shape as best seen in FIG. 5A. The two sides of the leaf spring are spot welded together at 76, thus making the stem of the "Y" behave as if it were a single and unitary piece of metal. An aligned pair of holes at 78 fits over the throw or crankarm 38 on the crankshaft.

The inside surface of cup-shaped piston 90 has a thickened ring milled therein. Then, abuttments are formed by drilling a hole through this thickened ring and along the diameter of the piston. Therefore, when the upper ends of the "Y" are pressed into the bottom of the piston, they slide up and over the ring, and into the diametrically positioned holes. The opposed dimples 80, 82 snap into those opposed holes, drilled into the piston. The upper, tab ends 96, 98 of the "Y" have a shape which guides and directs the ends over the thickened ring and fits the dimples into the holes or recesses.

The cylinder 100 (FIG. 6A) is a screw machine part having external threads 102 which turn onto threads (not shown) that are formed on the top of the crankcase. The piston 90 travels reciprocally within the cylinder 100 responsive to the rotation of the crankshaft. Cooling fins are formed on the outside of the cylinder to dissipate heat and to give radial strength with a minimum of weight.

As shown in FIG. 6B, the interior of the cylinder is grooved to provide a by-pass channel on one or both sides 104, 106. These by-pass channels extend from the bottom of the part 100 to a point reached by the piston after the crankshaft has rotated by about 110° from the top dead center position.

The air fuel mixture is drawn into the crankcase through channel 66 (FIG. 4A) in the cover 50 and through the crankcase port 28 (FIG. 1A). The air circulates within and around the crankcase between the lower flange and lower threaded area 102. When the piston is in the upper position, its skirt uncovers ports 118 (FIG. 6A) and the fuel intake is completed.

The cylinder head 110 (FIG. 1) has threads 112 which turn into mating threads 113 in the top of the cylinder 100. A glow coil 114 is mounted in the cylinder head to assist in starting the engine and, thereafter, running the engine.

The operation of the engine is conventional for engines of this type. A suitable battery is connected between a terminal 116 of the glow coil and the body of the engine. The glow coil heats and provides a means for igniting the fuel. Once the engine is running, the heat that it generates keeps the coil glowing.

The propeller is flipped, which turns the thrust washer 44 and, in turn, the crankshaft 30. As the crankarm or throw 38 rotates eccentrically about the shaft 32, the connecting rod 72 undertakes a linear motion which drives the piston 90 up and down in the cylinder 100. On the upstroke, the piston sucks fuel from tank 62 through jet 68, intake opening 66 and its aligned manifold 28, past the relief areas 104, 106, and into the cylinder.

The continued upstroke compresses the fuel and air mixture to a point where the glow coil ignites it. The exploding gas drives the piston downwardly and the expanding gas passes through the relief areas 104, 106 and out the exhaust openings in the cylinder, at 118, 120 (FIG. 6A).

Those who are skilled in the art will readily perceive how to modify the invention. Therefore, the appended claims are to be construed to cover all equivalent structures which fall within the true scope and spirit of the invention.

The claimed invention is:

1. An internal combustion engine comprising a crankcase and a fuel tank made of two casted pieceparts which nest together to form a closed crankcase housing and a fuel tank and also form matching openings formed in said two pieceparts to provide an air intake and a manifold leading from external air, past the fuel tank, and into the interior of said crankcase; a crankshaft journaled to rotate within said crankcase; a piston and connecting rod assembly consisting of two pieces, one of said two pieces being a connecting rod made from a generally "Y" shaped leaf spring rotatably mounted near the end of the stem of the "Y" on a throw on said crankshaft for undertaking a reciprocal motion within a cylinder responsive to a rotation of said crankshaft; and the other of said two pieces being a piston having diametrically opposed connectors for snapping onto connectors at the top members of said "Y" shaped leaf spring each of said connectors being a projection and a recess.

2. The engine of claim 1 wherein one of said two pieceparts forms said fuel tank and has a hole formed therein, said hole extending through the walls of the opening which forms said air intake and continues into the interior of said fuel tank, jet nozzle means press fit into said hole on one side of said air intake wall that leads into said fuel tank in order to form a passageway for fluid flow from said first tank into said air intake, the hole on the other side of said air intake being threaded for receiving and supporting a needle valve, said nozzle and said needle valve cooperating to regulate the flow of fuel from the fuel tank through said air intake and into the cylinder.

3. The engine of claim 1 wherein the piecepart which forms said fuel tank has a generally cup shape with an open side facing toward the back of the engine, the closed side of the cup fitting into and rests within said crankcase.

4. The engine of claim 3 wherein the open side of said cup shape is closed by a bulkhead on a model airplane which is behind the engine.

5. An internal combustion engine comprising a crankcase and a fuel tank made of two casted pieceparts which nest together to form a closed crankcase housing and a fuel tank; matching openings formed in said two pieceparts to provide an air intake and a manifold leading from external air, past the fuel tank, and into the interior of said crankcase; a crankshaft journaled to rotate within said crankcase; a connecting rod made from a generally "Y" shaped leaf spring comprised of a continuous strip of material which is folded back upon itself at its middle and joined together near the point where the arms of said "Y" shape diverge, said folded back part being rotatably mounted near the end of the stem of the "Y" on a throw on said crankshaft for undertaking a reciprocal motion within a cylinder responsive to a rotation of said crankshaft; and a piston having diametrically opposed connectors for snapping onto connectors at the top members of said "Y" shaped leaf spring.

6. An internal combustion engine comprising a crankcase and a fuel tank made of two casted pieceparts which nest together to form a closed crankcase housing and a fuel tank; matching openings formed in said two pieceparts to provide an air intake and a manifold leading from external air, past the fuel tank, and into the interior of said crankcase; a crankshaft journaled to rotate within said crankcase; a connecting rod made from a generally "Y" shaped leaf spring rotatably mounted near the end of the stem of the "Y" on a throw on said crankshaft for undertaking a reciprocal motion within a cylinder responsive to a rotation of said crankshaft; and a piston having diametrically opposed connectors for snapping onto connectors at the top members of said "Y" shaped leaf spring, said connectors on said leaf spring being dimples formed on opposing sides of the leaf spring at the upper arms of said "Y" shape, and said connectors on said piston being diametrically opposed holes for said dimples to snap into.

7. The engine of claim 6 wherein the tips of said "Y" shape member are shaped to guide and direct said dimples to snap into said holes.

8. A connecting rod for a very small internal combustion engine, said connecting rod comprising a strip of leaf spring metal folded in half and bent into a "Y" shape, the tip ends at the top of said "Y" being shaped to form first connector portions, and a cup-shaped piston having internal second connector portions shaped to receive and complete a connection between said connecting rod and said piston via said first and second connector portions.

9. The connecting rod of claim 8 wherein said first and second connector portions snap together inside said cup-shaped piston.

10. The connecting rod of claim 8 wherein said leaf spring metal is formed into said "Y" shape on progressive dies to form and shape said connecting rod with the precision of said dies.

11. The connecting rod of claim 8 wherein said first connector portions are outwardly extending dimples, and said second connector portions are diametrically opposed holes in said cup-shaped piston for said dimples to snap into.

12. The connecting rod of claim 11 wherein the internal walls of said piston have a thickened ring formed therein, said diametrically opposed holes being formed in said ring.

* * * * *